United States Patent
Maehara

(10) Patent No.: US 7,178,645 B2
(45) Date of Patent: Feb. 20, 2007

(54) BRAKE APPARATUS HAVING AUTOMATIC CLEARANCE ADJUSTING MECHANISM WITH OVERADJUSTMENT PREVENTER

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/910,340

(22) Filed: Aug. 4, 2004

(65) Prior Publication Data

US 2005/0034935 A1 Feb. 17, 2005

(30) Foreign Application Priority Data

Aug. 13, 2003 (JP) .......................... P.2003-207502
Jun. 29, 2004 (JP) .......................... P.2004-191486

(51) Int. Cl.
*F16D 65/14* (2006.01)
(52) U.S. Cl. ................ 188/196 P; 188/73.1; 188/71.7; 188/73.31
(58) Field of Classification Search ................ 188/71.7, 188/71.8, 71.9, 72.1, 72.4, 72.6, 72.9, 79.51, 188/79.56, 196 P, 106 F, 73.1, 73.31
See application file for complete search history.

(56) References Cited

U.S. PATENT DOCUMENTS

| | | | | |
|---|---|---|---|---|
| 3,459,282 A | * | 8/1969 | Beller et al. ............. | 188/106 F |
| 3,643,764 A | * | 2/1972 | Maurice .................... | 188/71.8 |
| 4,294,335 A | * | 10/1981 | Maehara .................... | 188/71.9 |
| 4,306,635 A | * | 12/1981 | Mitchell .................... | 188/72.4 |
| 5,086,884 A | * | 2/1992 | Gordon et al. ............. | 188/71.9 |
| 5,443,141 A | | 8/1995 | Thiel et al. | |
| 6,659,236 B1 | * | 12/2003 | Clark et al. .............. | 188/79.52 |

FOREIGN PATENT DOCUMENTS

| | | | |
|---|---|---|---|
| DE | 3142293 A1 | * | 5/1983 |
| DE | 3800733 A1 | * | 7/1989 |
| JP | 55100434 A | * | 7/1980 |
| JP | 5-74732 | | 10/1993 |
| JP | 6-71348 | | 10/1994 |

* cited by examiner

*Primary Examiner*—Melody M. Burch
(74) *Attorney, Agent, or Firm*—Morgan, Lewis & Bockius, LLP

(57) ABSTRACT

A brake apparatus having an automatic clearance adjusting mechanism with an overadjustment preventer constituted such that a piston is constituted by a structure of being divided in a plug piston 16 and a ring piston 14. The plug piston 16 is integrated with an adjusting nut 20, a bearing 21, a bearing support plate 22 and a spring holder 23. An outer side claw portion 23a of the holder is locked by an outer side groove 16 of the plug piston. The plug piston 16 integrated with the respective parts is inserted to fit to the ring piston 14 to thereby prevent the outer side claw portion 23a of the holder from being detached.

7 Claims, 8 Drawing Sheets

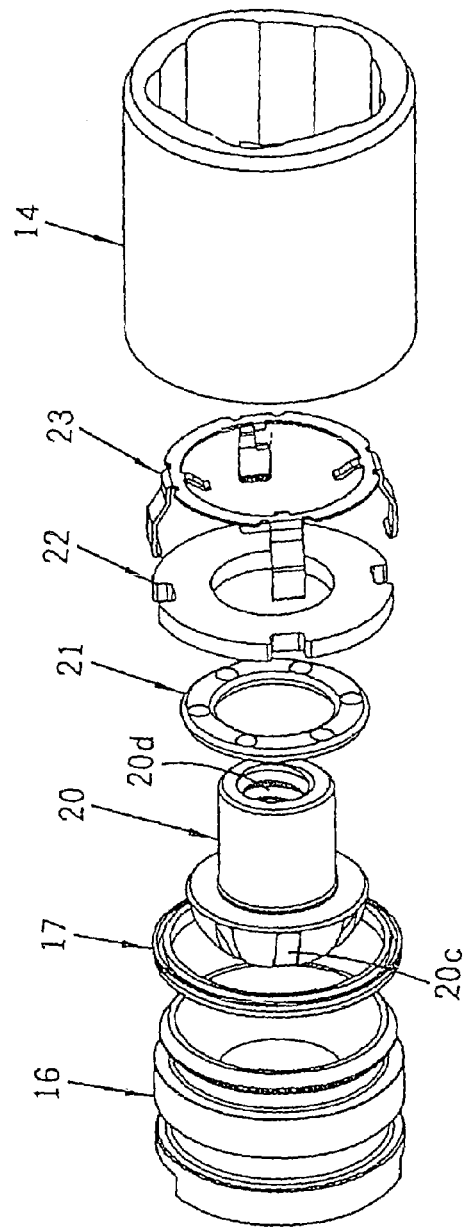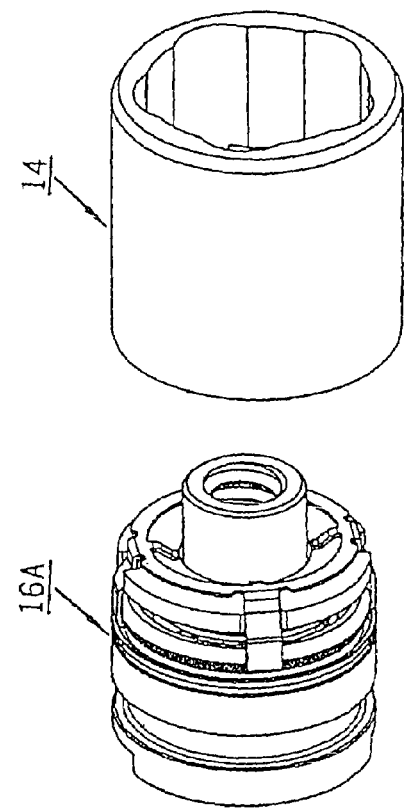
FIG. 4A
FIG. 4B

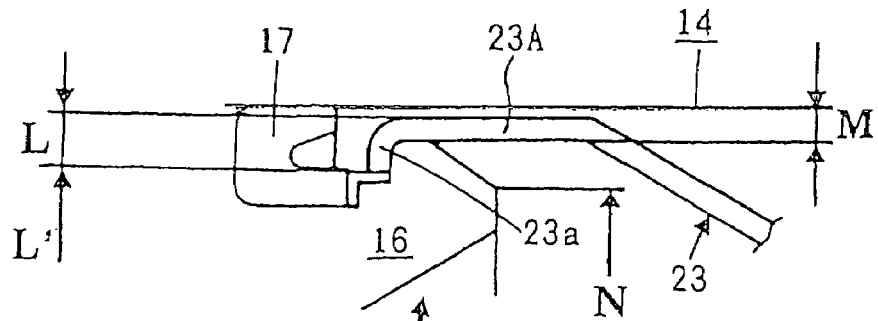
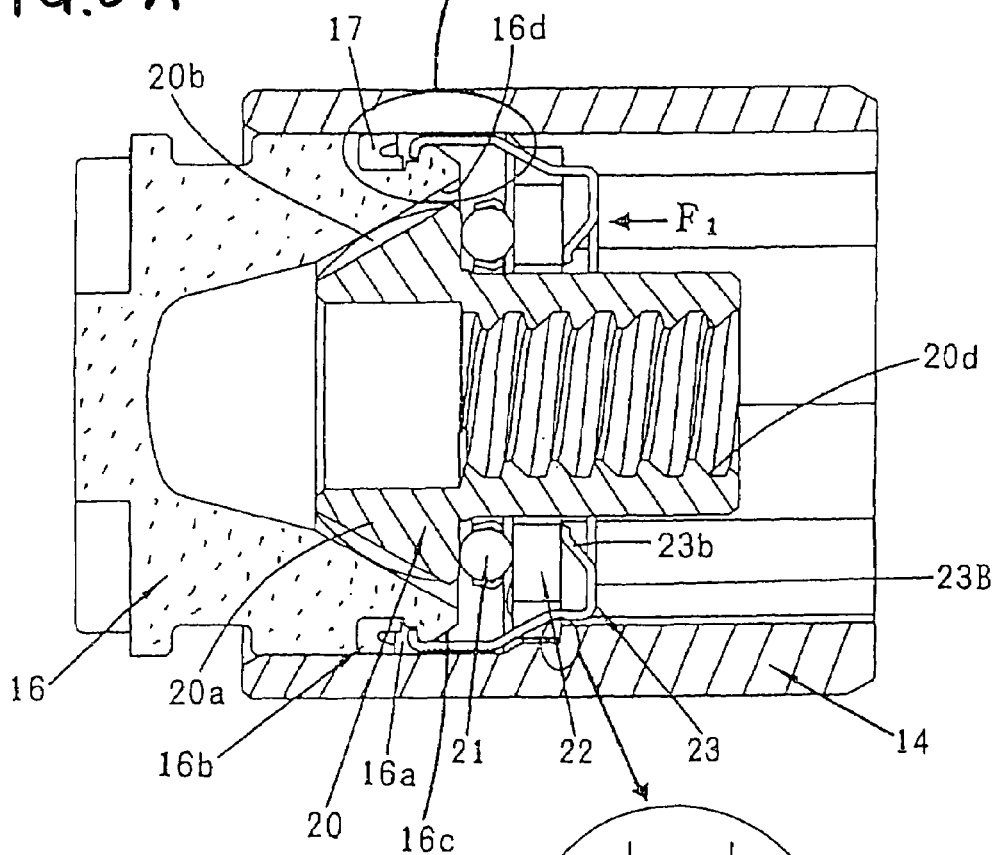
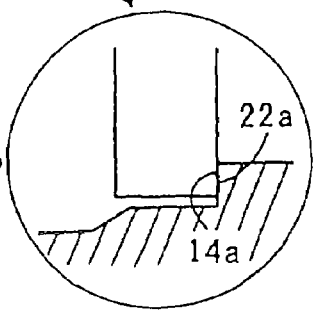

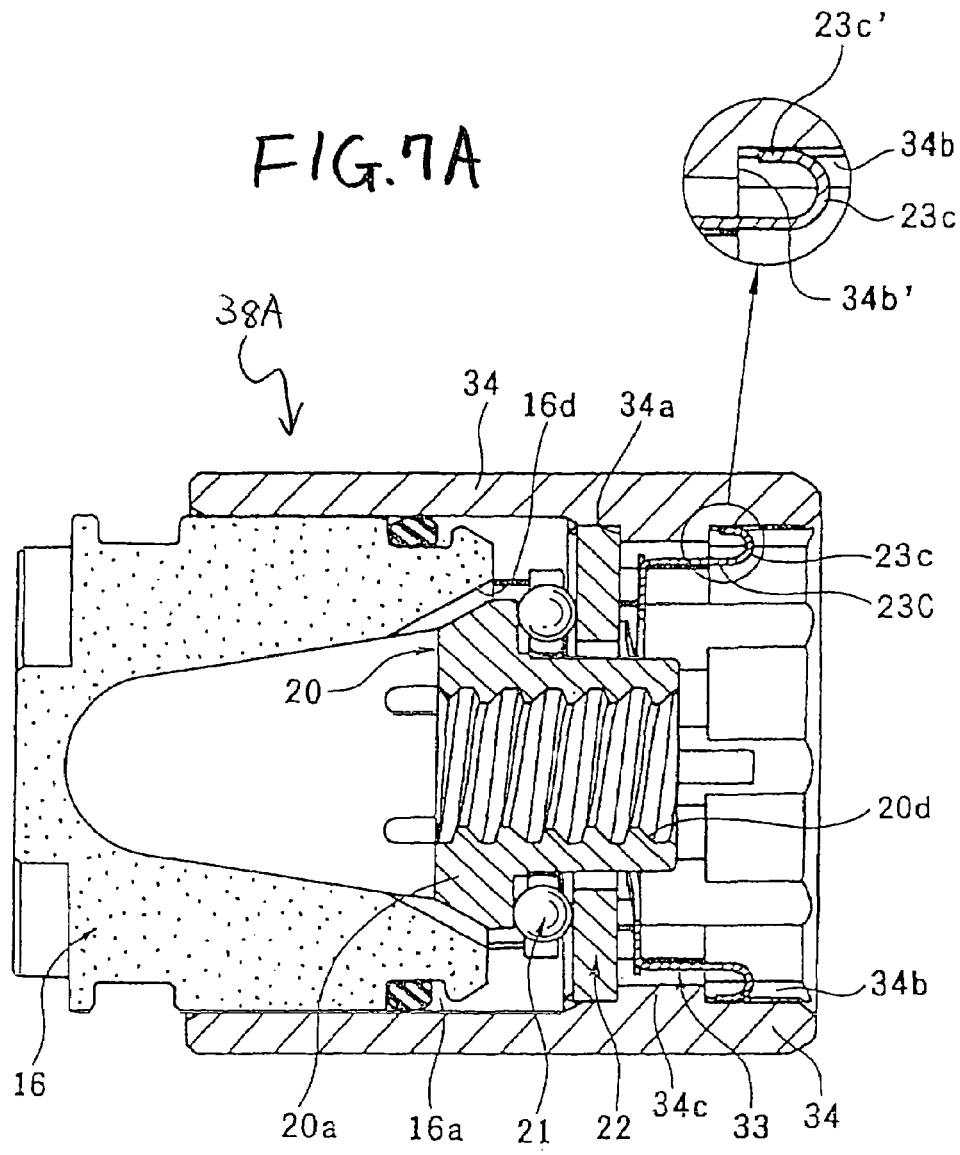

BRAKE APPARATUS HAVING AUTOMATIC CLEARANCE ADJUSTING MECHANISM WITH OVERADJUSTMENT PREVENTER

BACKGROUND OF THE INVENTION

The present invention relates to a brake apparatus with a parking brake, that presses a friction member to a rotor by operating a piston provided at inside of a cylinder portion of a caliper, and has an automatic clearance adjusting mechanism with an overadjustment preventer, provided between the cylinder and the piston, for properly maintaining a clearance between the friction member and the rotor by the overadjustment preventing automatic clearance adjusting mechanism.

As a brake apparatus having an automatic clearance adjusting mechanism with an overadjustment preventer of a background art, for example, JP-B-05-074732 is known. The brake apparatus of JP-B-05-074732 comprises a ring piston in which a piston provided at inside of a cylinder portion is slidable at the inside of the cylinder portion, and a plug piston that slides at the inside of the cylinder piston for pressing a friction member. In the brake apparatus, the automatic clearance adjusting mechanism is provided with an adjusting nut brought into contact with the plug piston, a bearing for rotating to support the adjusting nut, an adjusting spindle screwed to the adjusting nut by a reversible screw, a one way clutch for hampering the adjusting nut from being rotated in one direction, and a ring-like member integral with the adjusting nut for preventing overadjustment.

In adjusting a clearance, by a hydraulic operation of the plug piston, the adjusting nut is extracted from the adjusting spindle, and in preventing overadjustment, the ring-like member is pinched by the two pistons by a pressing force by hydraulic pressure operated to the ring piston to hamper the adjusting nut from being pivoted. Further, there is provided a mechanical operating mechanism in which in operating the parking brake, the friction member is pressed to the rotor by being brought into contact with the plug piston while hampering the adjusting nut from being pivoted by the one way clutch via the adjusting spindle.

Further, according to a brake apparatus of JP-u-06-071348, in preventing overadjustment, an adjusting nut is pressed to a friction coupling portion coupled with a piston by hydraulic pressure operated thereto to thereby prevent the adjusting nut from being pivoted.

However, the brake apparatus having the automatic clearance adjusting mechanism with the over adjustment preventer of the JP-B-05-074732, needs constraining means of the ring-like member for hampering the adjusting nut from being pivoted in preventing overadjustment and the one way clutch for hampering the adjusting nut from being pivoted in operating the parking brake. Therefore, a number of constituting parts is increased and also integration thereof is complicated. Further, according to the brake apparatus of JP-U-06-071348, a path and a chamber under the atmospheric pressure provided for hydraulically operating the adjusting nut must be ensured. Therefore, working and layout thereof are laborious.

SUMMARY OF THE INVENTION

The present invention has been carried out to resolve the problems. It is an object of the present invention to provide a brake apparatus having an automatic clearance adjusting mechanism with overadjustment preventer, reducing a number of parts, simplifying a structure thereof and facilitating integration by hampering an adjusting nut from being pivoted both in preventing overadjustment and in operating a parking brake.

In order to resolve the above-described problems, a brake apparatus having an automatic clearance adjusting mechanism with an overadjustment preventer of the present invention comprising: a rotor; a friction member; a caliper; a cylinder having a cylinder chamber and provided on the caliper; a piston, for pressing the friction member to the rotor, arranged in the cylinder; and an automatic clearance adjusting mechanism with an overadjustment preventer for properly maintaining a clearance between the friction member and the rotor, provided between the cylinder and the piston, wherein the piston includes: a ring piston slidable in the cylinder chamber; and a plug piston slidable in the ring piston to press the friction member, the automatic clearance adjusting mechanism includes: an adjusting nut having a friction portion frictionally coupled with the plug piston; a bearing for rotatably support the adjusting nut; and an adjusting spindle reversibly screwed to the adjusting nut, the plug piston and the adjusting nut are integrally assembled by a spring holder by interposing the bearing and a bearing support plate, and wherein, in adjusting a clearance, the adjusting nut is extracted from the adjusting spindle by a hydraulic operation of the plug piston until the adjusting nut is hampered from being pivoted by frictionally coupling with the plug piston, in preventing overadjustment, the adjusting nut is hampered from being pivoted by pressing the friction portion of the adjusting nut to the plug piston by an operation of the ring piston, and in operating the parking brake, the friction portion of the adjusting nut is pressed to the plug piston via the adjusting spindle.

When constituted in this way, since the adjusting nut is frictionally coupled with the plug piston, the adjusting nut is hampered from being pivoted by only pressing to the plug piston from a stepped engaging portion via the bearing support plate by a pressing force by hydraulic pressure operated to the ring piston in preventing overadjustment, a number of parts is reduced and a structure thereof is simplified. Further, it is not necessary to carry out difficult working to inside of the piston. Further, the plug piston and the adjusting nut are integrally assembled by the spring holder by interposing the bearing and the bearing support plate and therefore, the parts can be realized to facilitate to integrate to the cylinder portion.

In the brake apparatus, it is preferable that the spring holder includes a first outer side claw portion extended to a side of the plug piston, and the first outer side claw portion is formed with an engaging claw locked by a groove provided at an outer peripheral face of the plug piston on a side opposed to the rotor.

When constituted in this way, by locking the spring holder at inside of the groove of the plug piston via the engaging claw, the adjusting nut, the bearing, and the bearing support plate can firmly be integrated to the plug piston.

In the brake apparatus, it is preferable that the engaging claw of the first outer side claw portion is folded to bend to an inner side in a radius direction and a length in the radius direction of the engaging claw is longer than a maximum clearance formed by the ring piston and the plug piston.

When constituted in this way, by inserting a plug piston assembly comprising the plug piston and the adjusting nut integrally assembled by the spring holder to fit to the ring piston, the spring holder can be prevented from being detached and reliability is promoted.

In the brake apparatus, it is preferable that the first outer side claw portion is formed with an engaging projected portion for engaging a groove hole provided at an inner peripheral face of the ring piston.

When constituted in this way, the plug piston assembly comprising the plug piston and the adjusting nut can be integrated with the ring piston by the engaging projected portion of the spring holder and therefore, the plug piston assembly is dealt with as a subassembly part of the piston assembly to facilitate integration.

In the brake apparatus, it is preferable that the spring holder includes a second outer side claw portion extended to a side opposed to the rotor, and the second outer side claw portion includes an engaging claw engaged with a groove hole provided at an inner peripheral face of the ring piston on a side opposed to the rotor.

When constituted in this way, by the engaging claw formed at the second outer side claw portion of the spring holder, the plug piston assembly comprising the plug piston and the adjusting nut and the ring piston can firmly be integrated and therefore, the plug piston assembly is dealt with as the subassembly part of the piston assembly to facilitate integration.

In the brake apparatus, it is preferable that an outer peripheral face of the plug piston on a side opposed to the rotor is formed with a faced portion a diameter of which is contracted to an end side.

When constituted in this way, by pressing the spring holder from a side of an end face of an outer periphery of the plug piston, the engaging claw of the first outer side claw portion of the spring holder is easily engageable with the groove formed at the plug piston and operability of the subassembly of the plug piston is further promoted.

In the brake apparatus, it is preferable that the ring piston is slidable at inside of a cylinder chamber by matching an outer diameter dimension of the ring piston to an inner diameter dimension of the cylinder chamber with respect to a caliper having a different inner diameter dimension of the cylinder chamber.

When constituted in this way, the plug piston assembly integrally assembled by the spring holder is made to constitute a common part even for a caliper having a different cylinder size and can be dealt therewith by only changing a size of the ring piston.

The invention achieves the following effects.

<a> According to the invention, since the adjusting nut is frictionally coupled with the plug piston, in preventing overadjustment, by only pressing the adjusting nut to the plug piston from the stepped engaging portion via the bearing support plate by the pressing force by the hydraulic pressure operated to the ring piston to thereby achieve to reduce a number of parts and simplify the structure. Further, it is not also necessary to carry out difficult working to inside of the piston. Further, the plug piston and the adjusting nut are integrally assembled by the spring holder by interposing the bearing and the bearing support plate and therefore, the parts can be realized to facilitate to integrate to the cylinder portion.

<b> Further, by engaging the spring holder with the groove formed at the plug piston, the plug piston can be formed to be the subassembly and operability is promoted.

<c> Further, by inserting the plug piston assembly comprising the plug piston and the adjusting nut integrally assembled by the spring holder to fit to the ring piston, the spring holder can be prevented from being detached and operability is promoted.

<d> Further, the plug piston assembly comprising the plug piston and the adjusting nut can be integrated to the ring piston by the engaging projected portion of the spring holder and therefore, the plug piston is dealt with as the subassembly of the piston assembly to facilitate integration.

<e> Further, by the engaging claw formed at the second outer side claw portion of the spring holder, the plug piston assembly comprising the plug piston and the adjusting nut and the ring piston can firmly be integrated and therefore, the plug piston assembly is dealt with as the subassembly part of the piston assembly to facilitate integration.

<f> Further, by pressing the spring holder from the side of the end face of the outer periphery of the plug piston, the engaging claw of the first outer side claw portion of the spring holder can easily be engaged with the groove formed at the plug piston and operability of the subassembly of the plug piston is further promoted.

<g> Further, the plug piston assembly integrally assembled by the spring holder is made to constitute a common part even for a caliper having a different cylinder size and can be dealt therewith only by changing a size of the ring piston.

BRIEF DESCRIPTION OF THE DRAWINGS

FIG. 4A is a disassembled view of an adjusting nut and a piston.

FIG. 4B is a perspective view showing a state after integrally assembling the adjusting nut to a plug piston and before inserting the plug piston to fit to a ring piston.

FIG. 5A illustrates a sectional view showing a state of integrating the adjusting nut to the two pistons.

FIG. 5B is an outline partially enlarged view of FIG. 5A.

FIG. 5C is another outline partially enlarged view of FIG. 5A.

FIG. 7A illustrates a sectional view of a piston assembly integrally assembled with the plug piston and the ring piston according to the second embodiment of the invention.

FIG. 7B is an outline partially enlarged view of FIG. 7A.

DESCRIPTION OF THE PREFERRED EMBODIMENT

<First Embodiment>

Figure 1:
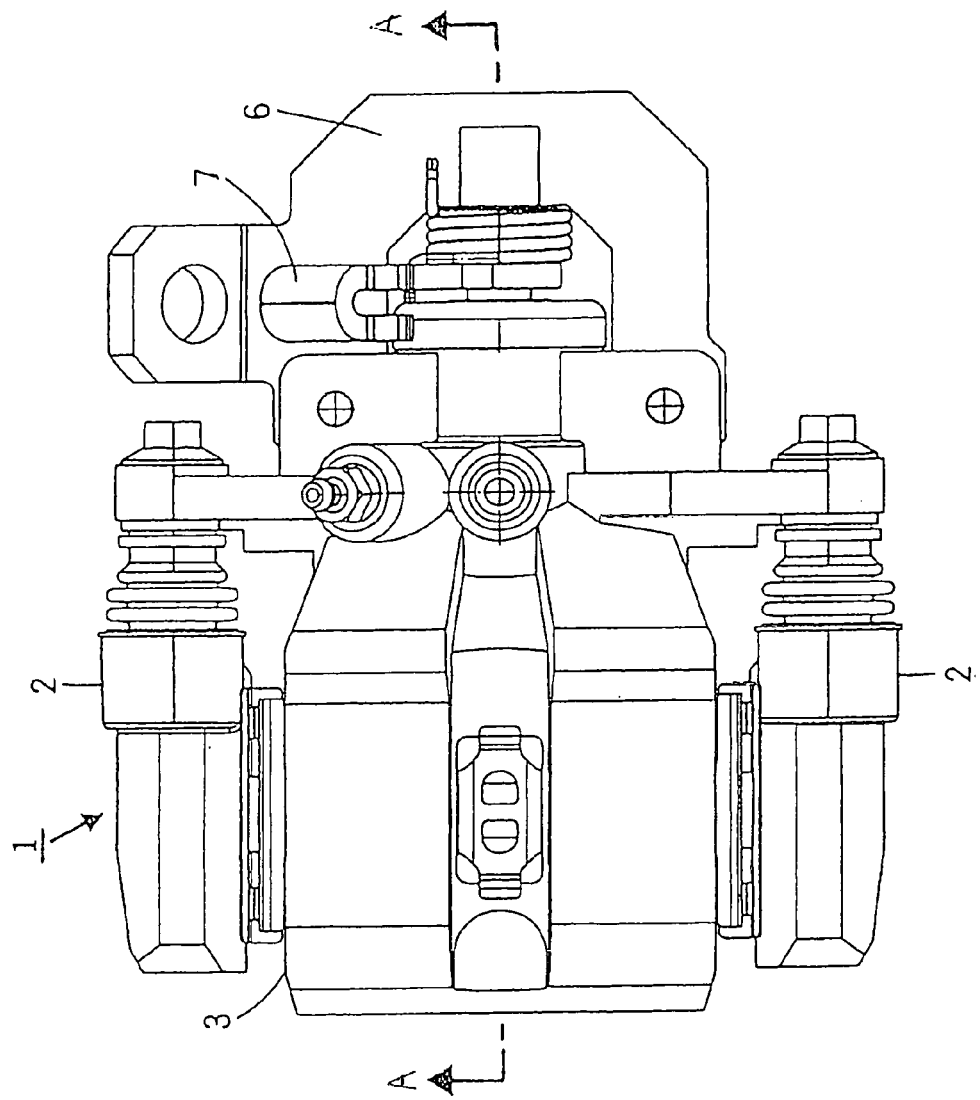
FIG. 1 is a plain view of a disc brake according to a first embodiment of the invention.

A first embodiment of the invention will be explained in reference to FIG. 1 through FIG. 5C as follows. FIG. 1 is a plane view of a disc brake to which the invention is applied, FIG. 2 is a side view of the brake apparatus, FIG. 3 is a sectional view taken along a line A—A of FIG. 1, FIG. 4A is a disassembled view of an adjusting nut and a piston, FIG. 4B is a perspective view showing a state after integrating the adjusting nut to a plug piston to integrate and before fitting to insert into a ring piston, FIG. 5A is a sectional view showing a state of integrating the adjusting nut to the two pistons, and FIGS. 5B and 5C are partially enlarged views of FIG. 5A.

Figure 2:
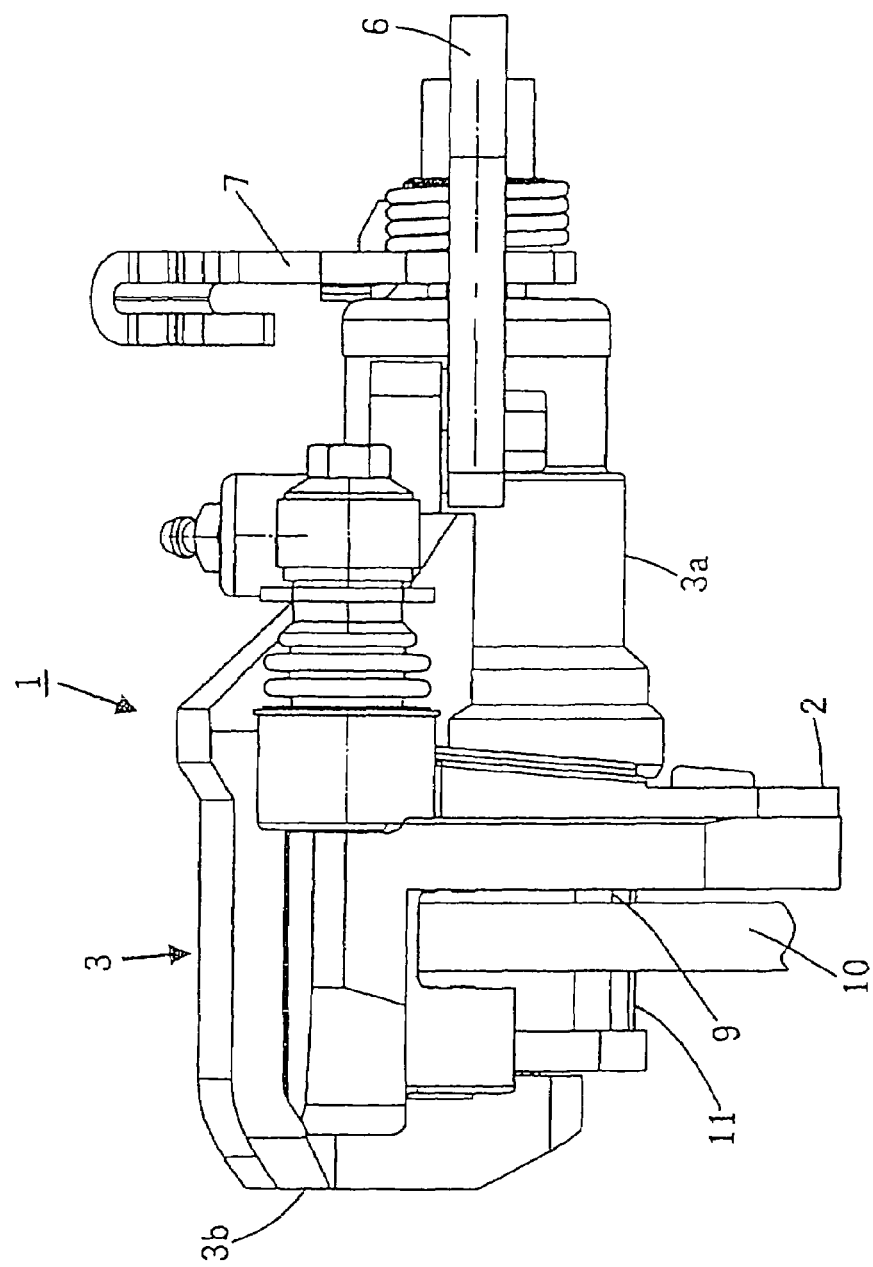
FIG. 2 is a side view of FIG. 1.
Figure 3:
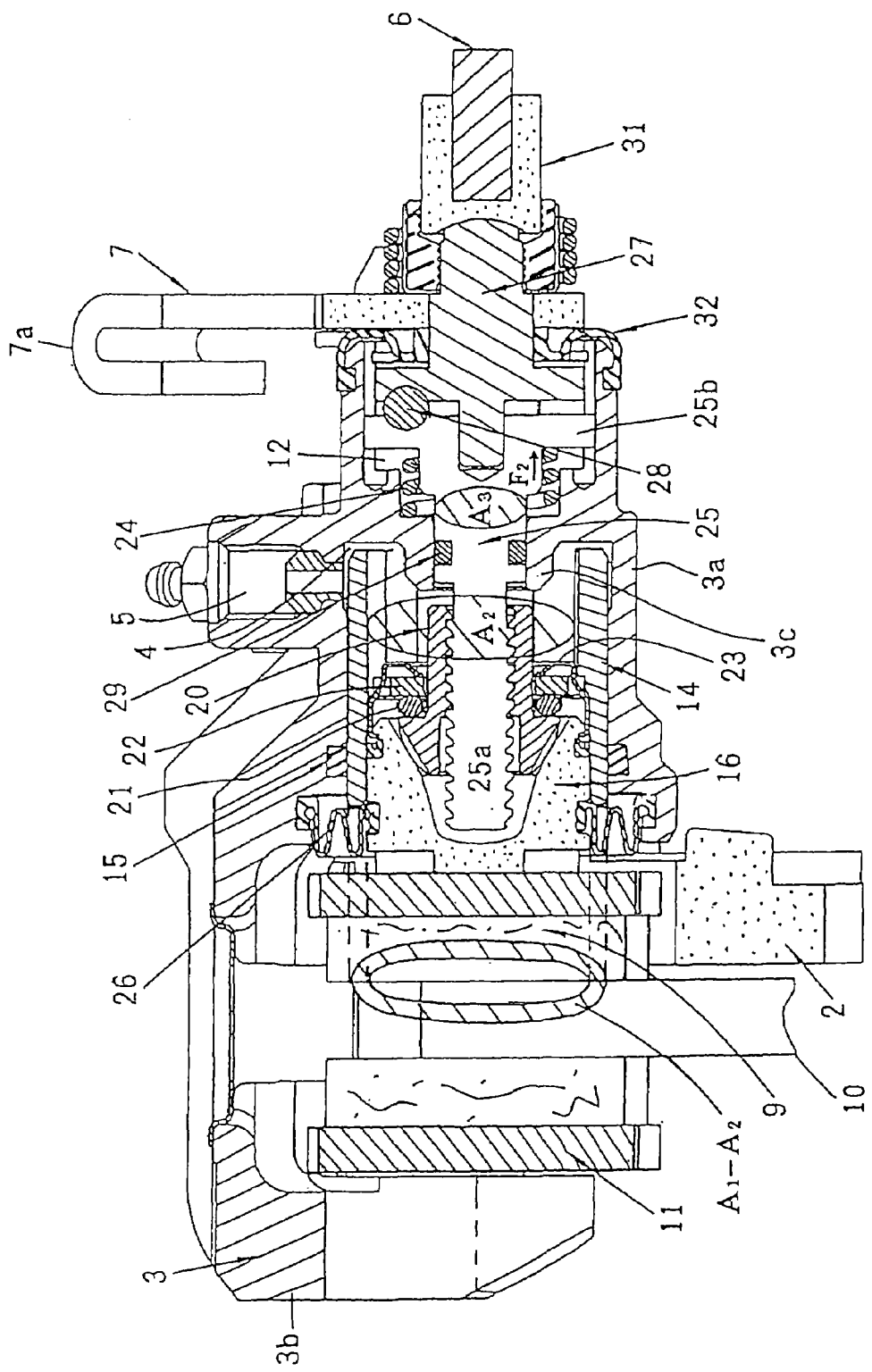
FIG. 3 is a sectional view taken along a line A—A of FIG. 1.

In FIG. 1 and FIG. 2, according to a disc brake 1, a caliper 3 is slidably supported by a support 2 fixed to a portion of a vehicle body. An inside of a cylinder portion 3a formed at the caliper 3 is formed with a cylinder chamber 4 for introducing a braking hydraulic pressure from a master cylinder via a hydraulic pressure introducing port 5. When the hydraulic pressure is introduced into the cylinder chamber 4, a piston, mentioned later, is operated, a friction pad 9 which is a friction member presses a rotor 10. Simultaneously therewith, a reaction force thereof is operated to an arm portion 3b of the caliper 3 to operate another friction pad 11 to the rotor 10 to be braked thereby.

Further, a bracket 6 is mounted to one end side of the caliper 3, and when a parking brake is operated, the rotor 10 is constituted to be braked similarly by the friction pads 9 and 11 by transmitting and operating force to a parking lever 7.

Next, an automatic clearance adjusting mechanism with overadjustment preventer of the present invention will be described in details in reference to FIG. 3 through FIG. 5C. The cylinder portion 3a of the caliper 3 is formed with the cylinder chamber 4 and a parking operating chamber 12. A ring piston 14 is slidably mounted to inside of the cylinder chamber 4 in liquid tight by a seal 15, and a plug piston 16 is further mounted slidably to inside of the ring piston 14 in liquid tight by a seal 17.

As shown by FIG. 4A, the plug piston 16 is mounted with the seal 17, an adjusting nut 20, a bearing 21, a bearing support plate 22 and a spring holder 23. The spring holder 23 includes a plurality, preferably four or five pieces of first outside claw portions 23A extended to a side of the plug piston 16. A front end of each first outside claw is formed with an engaging claw 23a folded to bend to an inner side in a radius direction thereof. The engaging claw 23a can be engaged with a groove 16a provided at the plug piston 16 on a side opposed to the rotor.

Further, the spring holder 23 includes an inner side claw portion 23B. A front end portion 23b of the inner side claw portion 23B is brought into contact with the bearing support plate 22. By pressing the bearing support plate 22 to the plug piston 16, the plug piston 16, the adjusting nut 20, the bearing 21, and the above-described plate 22 can be integrally assembled by the first outer side claw portion 23A and the inner side claw portion 13B as shown by FIG. 4B.

As an integrating method, when first, the seal 17 is fitted to a seal groove 16B of the plug piston 16. Thereafter, the adjusting nut 20, the bearing 11, and the bearing support plate 22 are fitted thereto. Finally, the engaging claw 23a of the first outer side claw portion 23A formed at one end portion of the spring holder 23 is pressed to a faced portion 16c a diameter of which is contracted to an end face of the plug piston 16, the engaging claw 23a can be locked by the groove 16a by outwardly expanding the first outer side claw portion 23A in a radius direction. Thereby, a plug piston assembly 16A shown by FIG. 4B is constructed.

At this occasion, the first outer side claw portion 23A is easily expanded outwardly in the radius direction and the spring holder is easy to integrate by making a diameter N of an end portion of the plug piston faced portion 16c smaller than a distance L' from a center axis line of the plug piston assembly 16A to a front end of the engaging claw 23a of the first outer side claw portion 23A.

Further, a shape of facing the plug piston may be constituted by a gradual slope, a stepped difference, a shape of a circular arc or the like.

In the plug piston assembly 16A integrated in this way, although a conical head portion 20a of the adjusting nut 20 on a side of the plug piston is frictionally coupled with a conical friction hole 16d of the plug piston 16, an outer peripheral face 20b of the conical head portion 20a is spherically formed to thereby constitute a stricture which is not exerted with a high friction coupling force so far as a large axial force in a left direction of FIG. 3 is not operated to the adjusting nut 20.

Further, the outer peripheral face 20b of the conical head portion 20a brought into contact with the conical friction hole 16d is formed with a plurality of pieces of through holes 20c [refer to FIG. 4A] of a brake fluid in a circumferential direction to effectively operate the hydraulic pressure to the plug piston 16.

As shown in FIG. 5C (the enlarged view of FIG. 5A), the plug piston assembly 16A is inserted into the ring piston 14 until a bearing support plate face 22a is brought into contact with a stepped engaging portion 14a at inside of the ring piston 14. Further, an assembly thereof is inserted to fit to inside of the cylinder chamber 4 and at the occasion, a female screw portion 20d of the adjusting nut 20 is screwed with a male screw portion 25a of an adjusting spindle 25 and the assembly is inserted to a front side of a partition wall 3c. The female screw portion 20d and the male screw portion 25a are constituted by reversible screws and when an axial thrust force is exerted to both of them, one of them can be rotated.

As shown by FIG. 3, a left end side of the plug piston assembly 16A is mounted with a piston boot 26 to maintain in airtight from outside and is brought into contact with the friction pad 9 supported by the fixed support member 2. When the plug piston assembly 16A is inserted to fit to the ring piston 14, as shown by FIG. 5B (the enlarged view of FIG. 5A), a length L in a radius direction of the engaging claw 23a is formed to be longer than a maximum clearance M formed by the ring piston 14 and the plug piston 16 and therefore, the spring holder 23 is not detached from the plug piston 16.

Meanwhile, inside of the parking operating chamber 12 formed at the cylinder portion 3a in FIG. 3 is arranged with a return spring 24 for urging the adjusting spindle 25 to a side opposed to the rotor, a spindle head portion 25b slidably holding the adjusting spindle 25 in an axial direction at inside of the parking operating chamber 12, a ramp rotor 27 pivotably supported at inside of the parking operating chamber 12, and a ball 28 pinched between the spindle head portion 25b and the ramp rotor 27.

Further, the male screw portion 25a of the adjusting spindle 25 is arranged at inside of the cylinder chamber 4. The spindle head portion 25b is arranged at inside of the parking operating chamber 12. The adjusting spindle 25 is constituted to slide in liquid tight at the partition wall 3c portioning the two chambers 4, 12 via a seal 29.

Further, the ramp rotor 27 is connected to one end of the parking lever 7. Other end 7a of the parking lever 7 is connected to a brake wire (not illustrated) pulled in parking operation. The ramp rotor 27 is constituted to be able to rotate around an axis line thereof.

Further, a rear end of the ramp rotor 27 is connected to the bracket 6 via a plug 31. Further, a cylinder boot 32 is mounted to the ramp rotor 27 on a right end side of the cylinder portion 3a to maintain in airtight from outside. Further, these parts, that is, the parking lever 7, the ramp rotor 27, the ball 28 and the adjusting spindle 25 constitute a mechanical type operating mechanism of the invention.

Next, an explanation will be given of operation of the automatic clearance adjusting mechanism with the overadjustment preventer.

When the brake is not operated, the adjusting spindle 25 is urged in a direction opposed to the rotor by the return spring 24. The outer peripheral face 20b of the adjusting nut 20 integrated by the spring holder 23 is brought into a state of being engaged with the conical friction hole 16d of the plug piston 16.

When hydraulic pressure from the master cylinder is introduced into the cylinder chamber 4 via the hydraulic pressure introducing port 5, the hydraulic pressure is applied to the ring piston 14 and the plug piston 16. A force in a direction of the rotor 10 operated to the ring piston 14 is transmitted to the adjusting nut 20 via the bearing support plate 22 to move the adjusting spindle 25 in the direction of the rotor 10. However, since a set force $F_2$ is large, the adjusting spindle 25 is constrained from being moved.

Meanwhile, the plug piston 16 is moved in the direction of the rotor 10 by the hydraulic pressure operated to the plug piston 16. However, when the moving distance is within a range of a proper clearance between the rotor 10 and the friction pad 9, the moving distance is absorbed by operating play of the screw portions 20d and 25a of the adjusting nut 20 and the adjusting spindle 25 and the adjusting nut 20 is not extracted from the adjusting spindle 25.

However, when the clearance between the rotor 10 and the friction pad is large by wearing the friction pads 9 and 11, an amount of moving the plug piston 16 in the direction of the rotor 10 exceeds the operating play of the screw portions 20d and 25a, the conical friction hole 16d of the plug piston 16 is going to be separated from the conical head portion 20a of the adjusting nut 20. Therefore, the adjusting nut 20 is extracted from the adjusting spindle 25 in the direction of the rotor 10 while being pivoted. A range of the hydraulic pressure which is automatically adjusted is a range of $P_1$ to $P_2$ in the following equation ($P_1$: hydraulic pressure of starting automatic adjustment, $P_2$: hydraulic pressure of finishing automatic adjustment (overadjustment preventing hydraulic pressure)).

Area $A_2$ of the plug piston 16×hydraulic pressure $P_1$>force $F_1$ of pressing the adjusting nut 20 by the spring holder 23, (Cylinder area $A_1$−area $A_2$ of the plug piston 16)× hydraulic pressure $P_2$>sectional area $A_3$ of the seal 29 of the adjusting spindle 25×hydraulic pressure $P_2$+force $F_2$ of pressing the adjusting spindle 25 by the return spring 24.

When brake is released, since the adjusting nut 20 is moved by an amount of being exerted to the side of the rotor 20, the amount of moving the plug piston 16 is returned within the range of an amount of the operating play of the screw portions 20d and 25a. Thereby, the clearance between the rotor 10 and the friction pad 9 is automatically adjusted. Further, the automatic adjustment is carried out until the hydraulic pressure is elevated to the hydraulic pressure $P_2$ of preventing over adjustment.

When the friction pads 9 and 11 are frictionally coupled with the rotor 10 to further elevate the hydraulic pressure to bend parts constituting brake including the caliper 3 and the plug piston 16 is moved in the direction of the rotor, the high hydraulic pressure is applied to the ring piston 14 to operate from the stepped engaging portion 14a of the ring piston to the adjusting nut 20 via the bearing support plate face 22a as a pressing force, the outer peripheral face 20b of the adjusting nut 20 is brought into contact with the conical friction hole 16d of the plug piston 16 to produce a high frictional coupling force. Further, the high friction coupling force overcomes a force ($A_3$×P) in the direction opposed to the rotor based on the set force $F_2$ of the return spring 24 and the hydraulic pressure operated to the adjusting spindle 25 (P: hydraulic pressure) to operate the adjusting spindle 25 in the direction of the rotor.

Therefore, the adjusting nut 20 is constrained from being pivoted and only the adjusting nut 20 is moved by following movement of the plug piston 16 and adjusting operation is not carried out. The hydraulic pressure is the hydraulic pressure when a large hydraulic pressure in the case of exceeding $P_2$ of the above equation is applied, the automatic clearance adjusting operation is hampered and therefore, overadjustment is prevented.

In operating parking brake, the parking lever 7 pivots the ramp rotor 27, the adjusting spindle 25 is operated in the direction of the rotor 10 by relatively rotating the ball 28 and the ramp rotor 27 and at the same time, the reaction force is transmitted to the caliper 3 via the parking bracket 6 and the friction pads 9 and 11 are pressed to the rotor 10 to be braked. At this occasion, the outer peripheral face 20b of the adjusting nut 20 is brought into contact with the conical friction hole 16d of the plug piston 16 by the adjusting spindle 25 to hamper the adjusting nut 20 from being pivoted and therefore, the automatic clearance adjusting operation is not brought about.

According to the invention, the piston is particularly constituted to divide into two of the ring piston and the plug piston and therefore, by preparing to match an outer diameter dimension of the cylinder piston 14 to an inner diameter dimension of the cylinder 4 with respect to a caliper having a different inner diameter dimension of the cylinder chamber 4, any difference in a cylinder size can be dealt with.

<Second Embodiment>

Figure 6A:
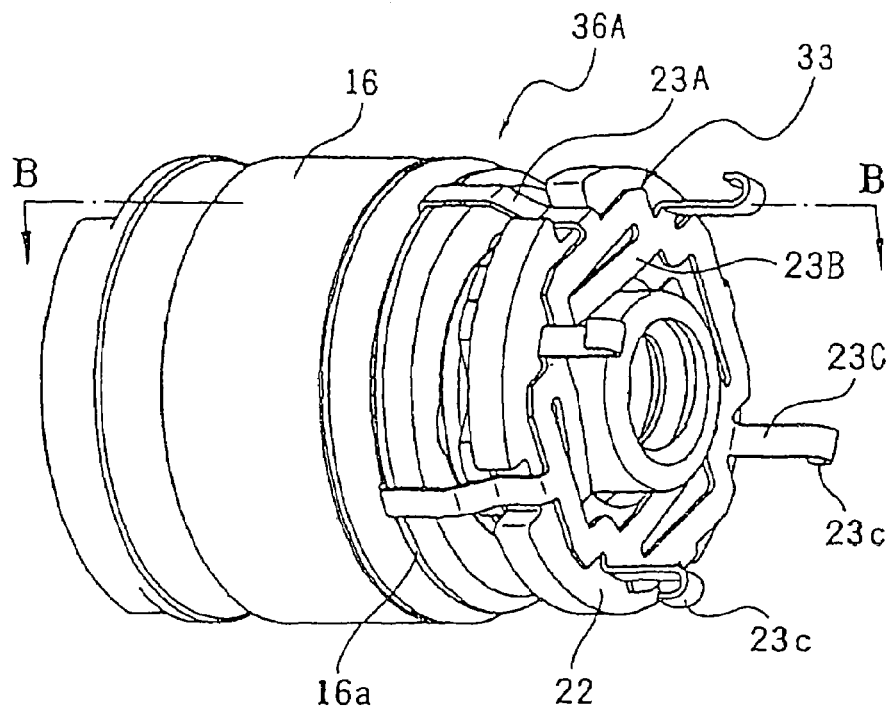
FIG. 6A is a perspective view of a plug piston assembly according to a second embodiment of the invention.
Figure 6B:
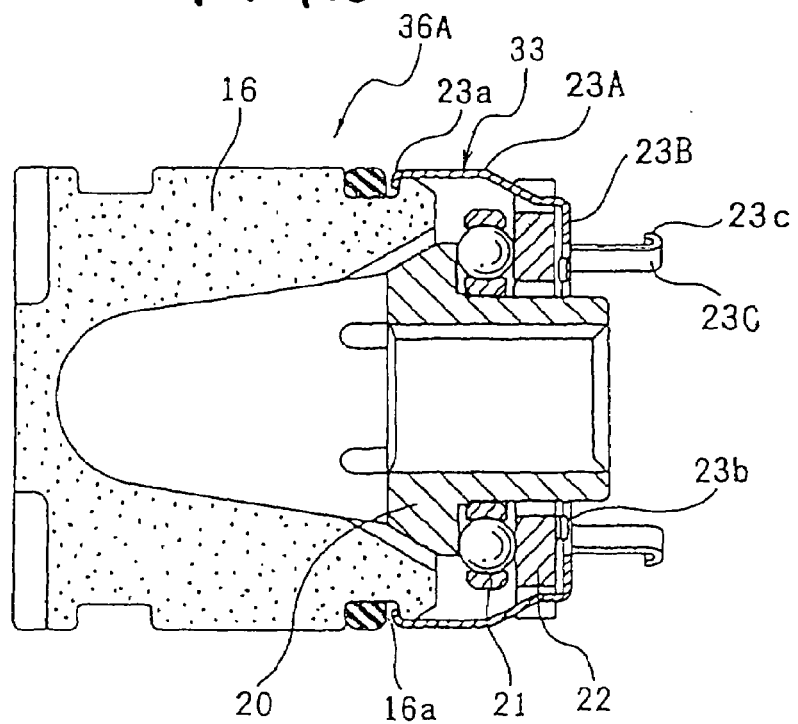
FIG. 6B is a sectional view taken along a line B—B of FIG. 6A.

Next, a second embodiment of the invention will be explained in reference to FIG. 6A, FIG. 6B, FIG. 7A and FIG. 7B. FIG. 6A is a perspective view of a plug piston assembly, FIG. 6B is a sectional view taken along a line B—B of FIG. 6A, and FIG. 7A is a sectional view of a piston assembly integrating a plug piston integrally with a ring piston. Further, in the second embodiment, mentioned below, with regard to structural portions similar to those of the first embodiment, mentioned above, a detailed explanation thereof will be omitted by attaching the same notations thereto.

As shown by FIG. 6A, a structure of a spring holder 33 constituting a plug piston assembly 36A differs from that of the spring holder 23 of the first embodiment. That is, the difference resides in that the spring holder 33 includes four pieces of second outer side claw portions 23C.

Further, as shown by FIG. 6B, the first outer side claw portion 23A and an inner side claw portion 23B are provided with functions and structures the same as those of the spring holder of the first embodiment, the engaging claw 23a of the first outer side claw portion 23A is locked by the groove 16a provided at the plug piston 16, a front end portion 23b of the inner side claw portion 23B is brought into contact with the bearing support plate 22 to press the bearing support plate 22 to the plug piston 16 to thereby integrally assemble the plug piston 16, the adjusting nut 20, the bearing 21, and the bearing support plate 22 by the first outer side claw portion 23A and the inner side claw portion 23B.

The second outer side claw portion 23C is extended to a side opposed to the first outer side claw portion 23A, that is, a side of other end portion of the ring piston 34 as shown by FIG. 7A, and an engaging claw 23c is bent to an outer side. Although the engaging claw 23c is fitted to a groove hole 34b of an inner peripheral face of an end portion of a ring piston 34, as shown by an enlarged view (FIG. 7B), a bent front end portion 23c' of the engaging claw 23c is not brought into contact with a groove wall 34b'.

According to a method of integrating a piston assembly 38A, the plug piston assembly 36A integrally assembled with the plug piston 16, the adjusting nut 20, the bearing 21, and the bearing support plate 22 by the first outer side claw portion 23A and the inner side claw portion 23B may be inserted into the ring piston 34, the bearing support plate 22 is brought into contact with a stepped engaging portion 34a of the ring piston 34, and the engaging claw 23c can be engaged with the groove hole 34b by riding over a contracted diameter portion 34c of the ring piston 34.

The plug piston 16 and the ring piston 34 are integrated in this way, the piston assembly 38A can be dealt with as a subassembly and therefore, the piston assembly 38A is convenient for storing and moving and also in inserting the subassembly into the cylinder chamber 4 of the caliper 3, the subassembly is brought into a state of being integrated with the piston assembly 38A and therefore, the subassembly can easily be integrated thereto.

In hydraulically braking, the hydraulic pressure from the master cylinder is introduced into the cylinder chamber 4, and the plug piston 16 is moved in the direction of the rotor 10. However, when the moving distance falls in the range of the proper clearance between the rotor 10 and the friction pad 9, the adjusting nut 20 is moved integrally with the plug piston 16, also the ring piston 34 is moved to the side of the rotor along with the second outer side claw portion 23C by being applied with the hydraulic pressure. The moving distance is absorbed by the operational play of the screw portions 20d and 25a of the adjusting nut 20 and the adjusting spindle 25 and the adjusting nut 20 is not extracted from the adjusting spindle 25. Further, when the hydraulic pressure is released, both of the plug piston 16 and the adjusting nut 20 return to original initial positions.

On the other hand, when the clearance between the rotor 10 and the friction pads 9 and 11 is large, the bent front end portion 23c' of the engaging claw 23c is not brought into contact with the groove wall 34b'. Therefore, the plug piston 16 is moved to exceed the operational play of the screw portions 20d and 25a along with the spring holder 33, the front end portion 23b of the inner side claw portion 23B is compressed to exert a pressing force to the adjusting nut 20. At this occasion, the conical friction hole 16d of the plug piston 16 is separated from the conical head portion 20a of the adjusting nut 20. Therefore, the adjusting nut 20 is extracted in the direction of the rotor 10 while being pivoted by the pressing force of the inner side claw portion 23B to carry out adjusting operation. Further, operation of preventing over adjustment is the same as that of the first embodiment. Therefore, an explanation of the operation will be omitted.

<Third Embodiment>

Figure 8A:
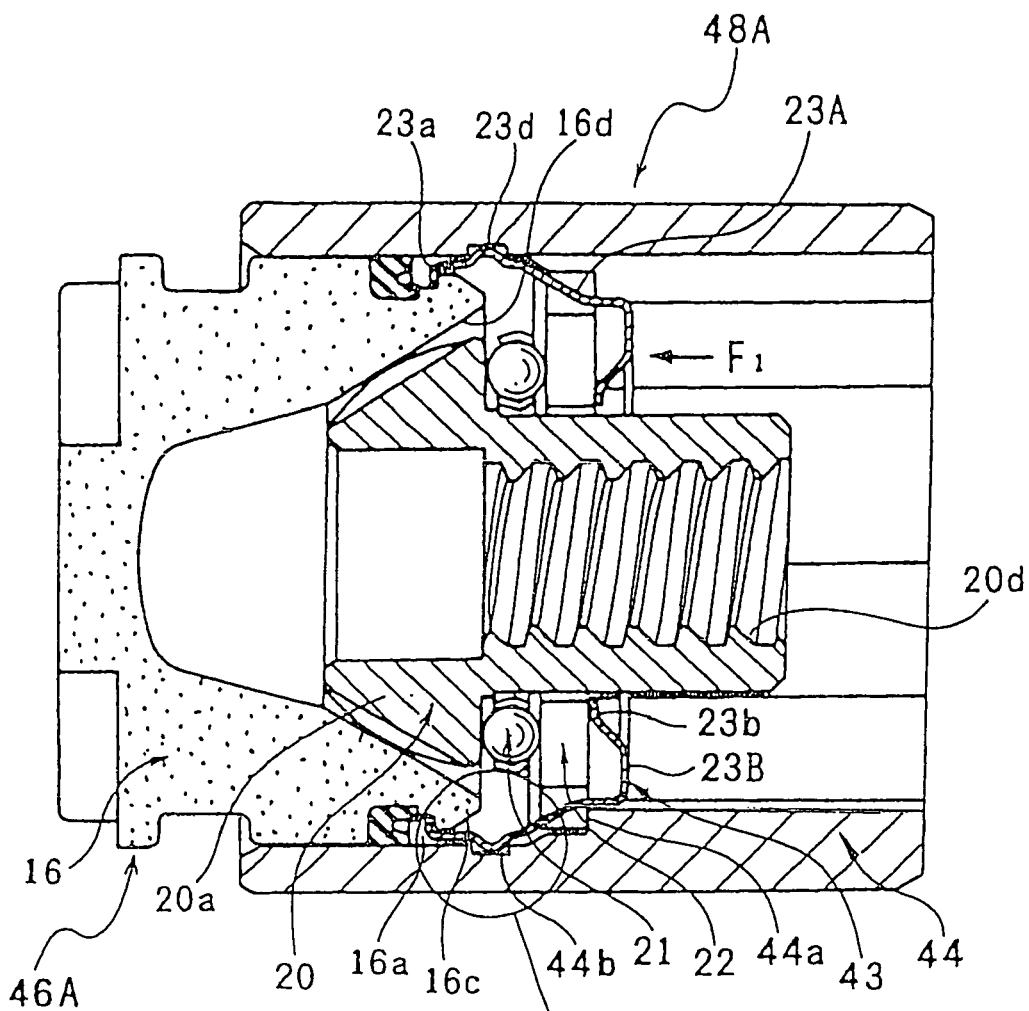
FIG. 8A illustrates a sectional view of a piston assembly integrally assembled with a plug piston and a ring piston according to a third embodiment of the invention.
Figure 8B:
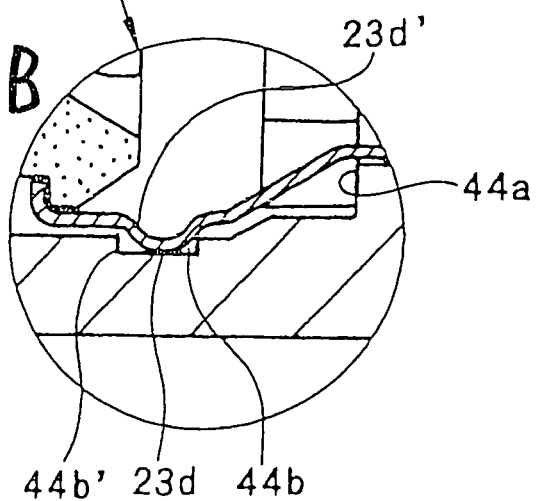
FIG. 8B is an outline partially enlarged view of FIG. 8A.

Next, a third embodiment of the invention will be explained in reference to FIG. 8A and FIG. 8B. FIG. 8A is a sectional view of a piston assembly integrally assembled with a plug piston and a ring piston. Further, in the third embodiment, mentioned below, with regard to structural portions similar to those of the first embodiment, mentioned above, a detailed explanation thereof will be omitted by attaching the same notations.

As shown by FIG. 8A, a plug piston assembly 46A is integrated with the plug piston 16 and the adjusting nut 20 by a spring holder 43 and a structure of the spring holder 43 differs from that of the spring holder 23 of Embodiment 1. That is, the difference resides in that a first outer side claw portion 23A is formed with an engaging projected portion 23d.

Further, as shown by FIG. 8A, the first outer side claw portion 23A and the inner side claw portion 23B are provided with functions and structures the same as those of the spring holder of the first embodiment. The engaging claw 23a of the first outer side claw portion 23A is engaged with the groove 16a provided at the plug piston 16, the front end portion 23b of the inner side claw portion 23B is brought into contact with the bearing support plate 22 to press the bearing support plate 22 to the plug piston 16 to thereby integrally assemble the plug piston 16, the adjusting nut 20, the bearing 21, the bearing support plate 22 by the first outer side claw portion 23A and the inner side claw portion 23B.

Substantially a middle potion of the first outer side claw portion 23A is formed with the engaging projected portion 23d. The engaging projected portion 23d is engaged with a groove hole 44b at an inner peripheral face of a ring piston 44 to construct a piston assembly 48A. Although the engaging projected portion 23d is fitted to the groove hole 44b, as shown by an enlarged view (FIG. 8B), a rotor side front end portion 23d' of the engaging projected portion 23d is not brought into contact with a groove wall 44b'.

According to a method of integrating the piston assembly 48A, the plug piston assembly 46A integrally assembled with the plug piston 16, the adjusting nut 20, the bearing 21, the bearing support plate 22 by the first outer side claw portion 23A and the inner side claw portion 23B may be inserted into the ring piston 44. The bearing support plate 22 is brought into contact with a stepped engaging portion 44a of the ring piston 44. The engaging projected portion 23d can be fitted to the groove hole 44b of the ring piston 34.

The plug piston 16 and the ring piston 44 are integrated by the spring holder 43 in this way and the piston assembly 48A can be dealt with as a subassembly. Therefore, the subassembly is convenient for storing and moving. Further, even when the subassembly is inserted into the cylinder chamber 4 of the caliper 3, since the piston assembly 48A is brought into a state of being integrated, the piston assembly 48A can easily be integrated thereto.

In hydraulical braking, the hydraulic pressure of the master cylinder is introduced into the cylinder chamber 4, the plug piston 16 is moved in the direction of the rotor 10 and when the moving distance falls in the range of the proper clearance between the rotor 10 and the friction pad 9, the adjusting nut 20 is moved integrally with the plug piston 16, also the ring piston 44 is moved to the side of the rotor along with the first outer side claw portion 23A by being applied with the hydraulic pressure, the moving distance is absorbed by the operational play of the screw portions 20d and 25a of the adjusting nut 20 and the adjusting spindle 25 and the adjusting nut 20 is not extracted from the adjusting spindle 25. Further, when the hydraulic pressure is released, both of the plug piston 16 and the adjusting nut 20 return to original initial positions.

On the other hand, when the clearance between the rotor 10 and the friction pads 9 and 11 is large, since the rotor side front end portion 23d' of the engaging projected portion 23d is not brought into contact with the groove wall 44b', the plug piston 16 is moved to exceed the operational play of the screw portions 20d and 25a along with the spring holder 43, and the front end portion 23b of the inner side claw portion 23B is compressed to exert the pressing force to the adjusting nut 20. At this occasion, the conical friction hole 16d of the plug piston 16 is separated from the conical head portion 20a of the adjusting nut 20 and therefore, the adjusting nut 20 is extracted to the direction of the rotor 10 while being pivoted by the pressing force of the inner side claw portion 23B. Further, the operation of preventing overadjustment is the same as that of the first embodiment and therefore, an explanation of the operation will be omitted.

Although an explanation has been given of the embodiments of the invention in reference of the drawings as described above, specific constitutions are not limited to the embodiments but, for example, the mechanical type operating mechanism is not limited to the ramp mechanism but maybe a mechanism of a cam type, further, although a description has been given of applying the brake apparatus having the automatic clearance adjusting mechanism with the overadjustment preventer to the disc brake, the apparatus is applicable also to a drum brake.

What is claimed is:

1. A brake apparatus comprising:
   a rotor;
   a friction member;
   a caliper;
   a cylinder having a cylinder chamber and provided on the caliper;
   a piston, for pressing the friction member to the rotor, arranged in the cylinder; and
   an automatic clearance adjusting mechanism with an overadjustment preventer for properly maintaining a clearance between the friction member and the rotor, provided between the cylinder and the piston;
   wherein the piston includes:
      a ring piston slidable in the cylinder chamber; and
      a plug piston slidable in the ring piston to press the friction member, the automatic clearance adjusting mechanism includes:
         an adjusting nut having a friction portion frictionally coupled with the plug piston;
         a bearing for rotatably supporting the adjusting nut; and
         an adjusting spindle reversibly screwed to the adjusting nut,
   the plug piston and the adjusting nut are directly integrally assembled by a holder, wherein the bearing and a bearing support plate are interposed between the adjusting nut and the holder, and the holder is directly engaged with the plug piston, and
   wherein, in adjusting a clearance, the adjusting nut is extracted from the adjusting spindle by a hydraulic operation of the plug piston until the adjusting nut is hampered from being pivoted by frictionally coupling with the plug piston,
   in preventing overadjustment, the adjusting nut is hampered from being pivoted by pressing the friction portion of the adjusting nut to the plug piston via the bearing support plate by an operation of the ring piston, and
   in operating a parking brake, the friction portion of the adjusting nut is pressed to the plug piston via the adjusting spindle, wherein the holder includes a first outer side claw portion extended to a side of the plug piston, and the first outer side claw portion is formed with an engaging claw that engages with a groove provided at an outer peripheral face of the plug piston on a side opposed to the rotor, and the first outer side claw portion extends over an outer circumference of the bearing support plate and an outer circumference of the bearing to clamp the bearing support plate to the plug piston.

2. The brake apparatus according to claim 1, wherein the engaging claw is folded to bend to an inner side in a radius direction, and a length in the radius direction of the engaging claw is longer than a maximum clearance formed by the ring piston and the plug piston.

3. The brake apparatus according to claim 1, wherein the first outer side claw portion is formed with an engaging projected portion for engaging woth a groove hole provided at an inner peripheral face of the ring piston.

4. A brake apparatus comprising:
   a rotor;
   a friction member;
   a caliper;
   a cylinder having a cylinder chamber and provided on the caliper;
   a piston, for pressing the friction member to the rotor, arranged in the cylinder; and
   an automatic clearance adjusting mechanism with an overadjustment preventer for for properly maintaining a clearance between the friction member and the rotor, provided between the cylinder and the piston;
   wherein the piston includes:
      a ring piston slidable in the cylinder chamber; and
      a plug piston slidable in the ring piston to press the friction member, the automatic clearance adjusting mechanism includes:
         an adjusting nut having a friction portion frictionally coupled with the plug piston;
         a bearing for rotatably supporting the adjusting nut; and
         an adjusting spindle reversibly screwed to the adjusting nut,
   the plug piston and the adjusting nut are directly integrally assembled by a holder, and
   wherein, in adjusting a clearance, the adjusting nut is extracted from the adjusting spindle by a hydraulic operation of the plug piston until the adjusting nut is hampered from being pivoted by frictionally coupling with the plug piston,
   in preventing overadjustment, the adjusting nut is hampered from being pivoted by pressing the friction portion of the adjusting nut to the plug piston by an operation of the ring piston, and
   in operating a parking brake, the friction portion of the adjusting nut is pressed to the plug piston via the adjusting spindle,
   wherein the holder includes a first outer side claw portion extended to a side of the plug piston, and the first outer side claw portion is formed with an engaging claw that engages with a groove provided at an outer peripheral face of the plug piston on a side opposed to the rotor, the first outer side claw portion extends over an outer circumference of the bearing support plate and an outer circumference of the bearing, to clamp the bearing support plate to the plug piston, wherein the holder includes a second outer side claw portion extended to a side opposed to the rotor, and the second outer side claw portion includes an engaging claw that engages with a groove hole provided at an inner peripheral face of the ring piston on a side opposed to the rotor.

5. The brake apparatus according to claim 1, wherein an outer peripheral face of the plug piston on a side opposed to the rotor is formed with a faced portion a diameter of which is contracted to an end side.

6. The brake apparatus according to claim 1, wherein the ring piston is slidable at inside of the cylinder chamber by matching an outer diameter dimension of the ring piston to an inner diameter dimension of the cylinder chamber with respect to the caliper having a different inner diameter dimension of the cylinder chamber.

7. The brake apparatus according to claim 1, wherein a conical head portion of the adjusting nut on a side of the plug piston is frictionally coupled with a conical friction hole of the plug piston, and an outer peripheral face of the conical head portion is spherically formed.

* * * * *